(12) United States Patent
Boss et al.

(10) Patent No.: US 9,493,166 B2
(45) Date of Patent: Nov. 15, 2016

(54) DRIVER REACTION TIME MEASUREMENT (71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/636,670

(22) Filed: Mar. 3, 2015

(65) Prior Publication Data
US 2015/0191177 A1    Jul. 9, 2015

Related U.S. Application Data (63) Continuation of application No. 14/149,170, filed on Jan. 7, 2014, now Pat. No. 9,073,430.

(51) Int. Cl.
  *B60W 40/08*  (2012.01)
  *B60K 28/06*  (2006.01)
  *B60W 50/00*  (2006.01)

(52) U.S. Cl.
  CPC .............. *B60W 40/08* (2013.01); *B60K 28/06* (2013.01); *B60K 28/066* (2013.01); *B60W 2050/0089* (2013.01); *B60Y 2400/30* (2013.01); *B60Y 2400/90* (2013.01)

(58) Field of Classification Search
  CPC ................... B60W 40/08; B60W 2050/0089; B60K 28/06; B60K 28/066; B60Y 2400/90; B60Y 2400/30
  See application file for complete search history.

(56) References Cited

U.S. PATENT DOCUMENTS

| 3,060,566 | A | 10/1962 | Herbig |
| 3,372,372 | A | 3/1968 | Carpenter et al. |
| 5,465,079 | A | 11/1995 | Bouchard et al. |
| 2002/0105423 | A1 | 8/2002 | Rast |
| 2006/0220826 | A1 | 10/2006 | Rast |

(Continued)

OTHER PUBLICATIONS

Copeland, Larry; Parents use technology to monitor teen drivers; USA Today; Oct. 20, 2012; 1 page.

(Continued)

*Primary Examiner* — Rodney Butler
*Assistant Examiner* — Frederick Brushaber
(74) *Attorney, Agent, or Firm* — Schmeiser, Olsen & Watts; Lisa J. Ulrich (57) ABSTRACT

A method and system for measuring driver reaction times is provided. The method includes identifying a driver of a vehicle and determining reaction times associated with a set of driving functions executed by the driver during a first driving process. The driver is determined to be currently driving the vehicle and currently executed driving functions are monitored. Current reaction times associated with the currently executed driving functions are identified and compared to the reaction times. Differences between the current reaction times and the reaction times are determined and logged. The differences indicate that the driver is currently executing a first driving distraction event and in response specified functions associated with the currently executed driving functions and/or the first driving distraction event are executed.

17 Claims, 3 Drawing Sheets

(56) References Cited

U.S. PATENT DOCUMENTS

| | | | |
|---|---|---|---|
| 2006/0271265 A1* | 11/2006 | Kawazoe | B60W 30/146 701/93 |
| 2011/0284304 A1 | 11/2011 | Van Schoiack | |
| 2011/0304465 A1* | 12/2011 | Boult | B60K 28/06 340/576 |
| 2012/0068858 A1 | 3/2012 | Fredkin | |
| 2012/0071151 A1 | 3/2012 | Abramson et al. | |
| 2012/0072121 A1 | 3/2012 | Mollicone et al. | |
| 2012/0133528 A1 | 5/2012 | Lee et al. | |
| 2012/0176232 A1* | 7/2012 | Bantz | G07C 5/008 340/439 |
| 2012/0289214 A1* | 11/2012 | Hynes | H04M 1/72577 455/418 |
| 2013/0015010 A1* | 1/2013 | Junge | A61B 5/162 180/272 |
| 2014/0139655 A1* | 5/2014 | Mimar | G08B 21/0476 348/77 |
| 2014/0168399 A1* | 6/2014 | Plummer | B60Q 9/00 348/78 |
| 2014/0172467 A1* | 6/2014 | He | B60K 28/066 705/4 |
| 2014/0179353 A1* | 6/2014 | Simon | H04W 4/043 455/456.2 |

OTHER PUBLICATIONS

Unknown; System, Method, and Computer Program for Analyzing a User's Driving Behavior; IP.com; IPCOM000225832D; Electronic Publication Date Mar. 7, 2013; 21 pages.

Anonymous; Monitor Emotional Intensity Level of Conversation While Driving; IP.com; IPCOM000222317D; Electronic Publication Date Sep. 25, 2012; 4 pages.

Notice of Allowance (Mail Date Mar. 2, 2015) for U.S. Appl. No. 14/149,170; Filing Date Jan. 7, 2014; Confirmation No. 8595.

* cited by examiner

DRIVER REACTION TIME MEASUREMENT

This application is a continuation application claiming priority to Ser. No. 14/149,170 filed Jan. 7, 2014, now U.S. Pat. No. 9,073,430, issued Jul. 7, 2015.

BACKGROUND

1. Field of the Invention

The present invention relates generally to a method for measuring driver reaction times, and in particular to a method and associated system for determining driver reaction times during driving distraction events.

2. Description of the Related Art

Determining driver distraction issues typically includes an inaccurate process with little flexibility. Evaluating solutions to driver distraction issues may include a complicated process that may be time consuming and require a large amount of resources. Accordingly, there exists a need in the art to overcome at least some of the deficiencies and limitations described herein above.

SUMMARY

A first aspect of the invention provides a method comprising: determining, by a computer processor, reaction times associated with a set of driving functions executed by a driver of a vehicle, wherein the set of driving functions are executed by the driver during a first driving process of the vehicle; after the determining the reaction times, detecting by the computer processor, the driver in the vehicle; determining, by the computer processor, that the driver is currently driving the vehicle; monitoring, by the computer processor, currently executed driving functions associated with the set of driving functions; identifying, by the computer processor, current reaction times associated with the currently executed driving functions; comparing, by the computer processor, the current reaction times with the reaction times; determining, by the computer processor based on results of the comparing, differences between the current reaction times with the reaction times; logging, by the computer processor, the differences to a driver action log; determining, by the computer processor based on the driver action log, that the driver is currently executing a first driving distraction event; and executing, by the computer processor based on the determining that the driver is currently executing a first driving distraction event, specified functions associated with the currently executed driving functions and/or the first driving distraction event.

A second aspect of the invention provides a computing system comprising a computer processor coupled to a computer-readable memory unit, the memory unit comprising instructions that when executed by the computer processor implements a method comprising: determining, by the computer processor, reaction times associated with a set of driving functions executed by a driver of a vehicle, wherein the set of driving functions are executed by the driver during a first driving process of the vehicle; after the determining the reaction times, detecting by the computer processor, the driver in the vehicle; determining, by the computer processor, that the driver is currently driving the vehicle; monitoring, by the computer processor, currently executed driving functions associated with the set of driving functions; identifying, by the computer processor, current reaction times associated with the currently executed driving functions; comparing, by the computer processor, the current reaction times with the reaction times; determining, by the computer processor based on results of the comparing, differences between the current reaction times with the reaction times; logging, by the computer processor, the differences to a driver action log; determining, by the computer processor based on the driver action log, that the driver is currently executing a first driving distraction event; and executing, by the computer processor based on the determining that the driver is currently executing a first driving distraction event, specified functions associated with the currently executed driving functions and/or the first driving distraction event.

A third aspect of the invention provides a computer program product for technical solution analysis, the computer program product comprising: one or more computer-readable, tangible storage devices; program instructions, stored on at least one of the one or more storage devices, to determine reaction times associated with a set of driving functions executed by a driver of a vehicle, wherein the set of driving functions are executed by the driver during a first driving process of the vehicle; program instructions, stored on at least one of the one or more storage devices, to detect the driver in the vehicle after determining the reaction times; program instructions, stored on at least one of the one or more storage devices, to determine that the driver is currently driving the vehicle; program instructions, stored on at least one of the one or more storage devices, to monitor currently executed driving functions associated with the set of driving functions; program instructions, stored on at least one of the one or more storage devices, to identify current reaction times associated with the currently executed driving functions; program instructions, stored on at least one of the one or more storage devices, to compare the current reaction times with the reaction times; program instructions, stored on at least one of the one or more storage devices, to determine differences between the current reaction times with the reaction times; program instructions, stored on at least one of the one or more storage devices, to log the differences to a driver action log; program instructions, stored on at least one of the one or more storage devices, to determine that the driver is currently executing a first driving distraction event; and program instructions, stored on at least one of the one or more storage devices, to execute specified functions associated with currently executed driving functions and/or a first driving distraction event.

The present invention advantageously provides a simple method and associated system capable of determining driver distraction issues.

DETAILED DESCRIPTION

Figure 1:
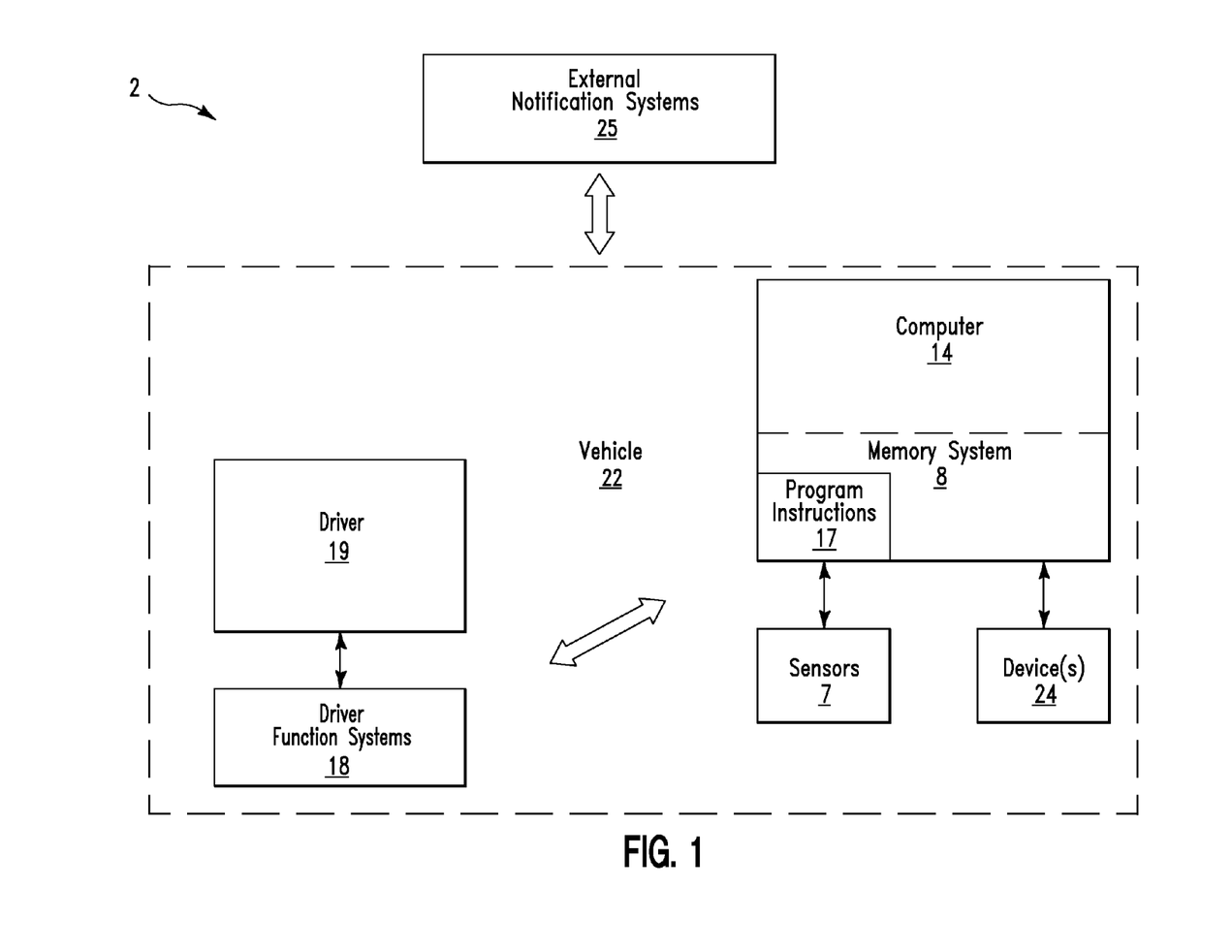
FIG. 1 illustrates a system for providing a means for associating driver reaction times during a driver distraction event, in accordance with embodiments of the present invention.

FIG. 1 illustrates a system 2 for providing a means for associating driver reaction times during a driver distraction event, in accordance with embodiments of the present invention. System 2 may perform a baseline measurement of drivers' normal reaction times during a current driving event. System 2 then monitors and measures a current reaction time during a driver distraction event such as, inter alia, cell phone usage. Results of the current reaction time measurement are presented to the driver 19 and/or additional parties to determine if the driver distraction event should be discontinued.

System 2 of FIG. 1 includes external notification systems 25 communicatively connected to a vehicle 22. The vehicle includes a computer 14, driver function systems 18, sensors 7, and devices 24 (i.e., driver distraction devices). Computer 14 is communicably connected to driver function systems 18, sensors 7, and devices 24. Computer 14 may include any type of computing system(s) including, inter alia, a computer (PC), a laptop computer, a tablet, memory system 8 which stores program instructions 17 for associating driver reaction times during a driver distraction event. Program instructions 17 transmit a result of the association analysis to external notification systems 25.

System 2 indicates a driver's impairment level while engaged in distracting activities such as, inter alia, texting or talking on a cellular telephone. System 2 measures a driver's reaction times to determine if the distracting activities event should be discontinued.

System 2 associates a driver reaction time while engaged in distraction activities and delivers results to the driver at a time when vehicle 22 is not in operation. Distraction activities may include, inter alia, talking, texting, unlocking a phone with a password, entering a GPS navigation destination, tuning a radio or music player, etc. System 2 may performs a baseline measurement of the driver's normal reaction times while driving without distractions. Additionally, system 2 monitors driver distraction events (e.g., cell phone usage) and measures the current reaction times during real time road conditions. Results of the monitoring may be displayed to the driver 19 and/or additional parties to determine if the distracting activities event should be discontinued.

System 2 performs the following functions:
1. Measurement of a driver's base line reaction times for a given set of events (e.g., stopping at an intersection, reaction time to brake when a vehicle in front is slowing down, lane change events, lane weaving/wondering, etc.).
2. Measuring a driver reaction time delta for a given set of driving events.
3. Correlating driving events with specific mobile device operations (i.e., distraction events).
4. Generating a warning (e.g., a tone or sound) indicating that a reaction time analysis reaches a threshold. Additionally, a delayed notification (heads up display, dashboard, console, mobile phone, email, etc.) may be enabled.
5. Optionally perform a given action (e.g., disable a radio, etc. if the distraction event causes a reaction time exceeding a threshold considered for safe driving).

An implementation example for determining baseline reaction times for events (e.g., stopping times, lane change events, lane weaving, etc.) is described as follows:

System 2 detects that driver 19 is currently using a mobile device while driving vehicle 22. In response, system 2 begins to measure reaction times while the user is not distracted in order to establish a baseline. The baseline may be developed with a requirement for a predetermined number of samples. System 2 enables sensors 7 to record events (e.g., vehicle braking) and in response, system 2 measures a time period for a user to react to the event (e.g., vehicle braking) A number and type of baseline events are determined based on capabilities of vehicle 22 and external available data points. For example, certain vehicles comprise external proximity sensors that determine when a vehicle in front is braking and to what degree a distance between the vehicles is closing (i.e., how aggressively they are braking). In response, system 2 uses the event (i.e., braking event) to trigger a baseline measurement. Alternatively, system 2 may use a mobile application (on a mobile device) to trigger an on board camera to evaluate specified driving conditions (e.g., a distance of a leading vehicle). Additionally, the mobile device may detect a color of a stop light and measure the color as a "red light start" event or time. With respect to the aforementioned implementation example for determining baseline reaction times, program instructions 17 enable the following process steps:
1. Identification of a driver 19.
2. Monitoring vehicle 22 events.
3. Monitoring cellular telephone inactivity using a device usage log.
4. Monitoring a corresponding or expected action from driver 19 and logging the action to a driver action log.

An implementation example for detecting and correlating distracted driver activity with specific vehicle operations is described as follows:

A cell phone registers with computer 14 in vehicle 22 prior to starting vehicle 22 (or immediately after vehicle 22 is started). For example, a Bluetooth, NFC, or Wi-Fi pairing process may be used to initiate a registration process. Upon enablement of the pairing event, computer 14 is linked directly the cellular telephone. In response, vehicle motion sage events are monitored and each monitored event is logged with a date/time stamp in a device usage log. Additionally, vehicle 22 maintains a vehicle event log that tracks vehicle parameters such as, inter alia, speed, acceleration, lane changes, turn signal events, brake events, distances, routes, etc. Therefore (since device usage log and vehicle event log have date/time stamps), computer 14 may correlate when a driver's phone is inactive/active and whether or not the driver 19 is in motion or stopped. With respect to the aforementioned implementation example for detecting and correlating distracted driver activity, program instructions 17 enable the following process steps:
1. Authenticating (or pairing) a phone with vehicle 22.
   A. Opening vehicle 22 door with the phone (e.g., via an NFC chip).
   B. Starting vehicle 22 with the phone (e.g., via an NFC/Bluetooth chip).
   C. Pairing the phone after vehicle 22 is started (e.g., via Bluetooth).
   D. Pairing the phone via 3G, 4G, and/or a mobile application from the vehicle manufacturer accessing computer 14.
2. Transmitting device usage logs to computer 14 or alternatively the driver's phone.
3. Retrieving vehicle event logs from computer 14.
   A. Correlating device and vehicle events.

An implementation example for measuring a change in driver reaction time for a given set of events is described as follows:

The measurement process comprises retrieving recorded, real-time, or near real-time data from computer 14 and determining correlations between events. The correlations may utilize baseline data or data retrieved from just prior to an event for a comparison point (e.g. all data prior to an incoming telephone call could be considered baseline data and data from the time of incoming call to call determination may be used to compare against the baseline data).

With respect to the aforementioned implementation example for measuring a change in driver reaction time, program instructions 17 enable the following process steps:
1. Identifying potential distraction events in data (e.g., an incoming call, a radio station change, etc.).
2. For each key factor affecting driving safety (e.g., speed, braking, etc.), comparing baseline data with data retrieved during a distraction event and sub-events during an event period (e.g., call initiation (first ring to answer), conversation period, call termination (hang-up+n seconds–n seconds, handset usage, Bluetooth, etc.).
3. Comparing baseline and key factors associated with the data. For example, if speed comprises the datum being examined, a determination is made with respect to a variation in the speed prior to the event and during the event or sub-events. The comparison may consider external factors from other devices (e.g., GPS data, road signs, etc.). A variation in speed determination may include:
   A. Determining if a speed change exceeds a small delta (e.g. >3-5 mph)?
   B. If no, then no speed distraction is detected.
   C. If yes, then were there contributing factors as determined by other systems (e.g., there was a change in allowed speed limit as communicated by GPS system or intelligent road signs). If contributing factor is attributed to the change in speed, then no speed distraction detected.
   D. If no, then determine that the event contributed to a potentially unsafe speed adjustment (either up or down).
   E. Log or notify the unsafe speed event.
   F. Repeat the process for all key factors (e.g., braking, lane sway, etc.).

An implementation example for correlating driving events with specific mobile device operations is described as follows:

System 2 determines driver functions when determined reaction times (for an event) exceed a baseline threshold. The event is correlated to a determined behavior.

With respect to the aforementioned implementation example for correlating driving events, program instructions 17 enable the following process steps:
1. A baseline associated with a skill and attentiveness of driver 19 is determined.
2. The driver's current skill and attentiveness (e.g., reaction times) is monitored and when the reaction times exceed a determined threshold, driver functions are determined. For example:
   A. An onboard camera may be used to determine if driver 19 was not looking at the road.
   B. It may be determined if radio stations or CDs were being changed.
   C. Listening sensors within vehicle 22 may be used to determine if a call came in or if an active Bluetooth connection is enabled.
   D. It may be determined if a GPS device has been modified.
3. A determined distraction event is logged into system 2.
4. A log of phone usage is retrieved and phone activity is associated with threshold exceeded reaction times.

An implementation example for displaying a reaction time analysis (e.g., via a heads up display, dashboard, console, mobile phone, email, etc.) for a driver 19 is described as follows:

An analysis of the driver's behavior may be presented to driver 19 in real-time, near real-time, at the end of a driving session, or at user request. The analysis may be presented via a heads up display system, a dashboard/console text display, a radio display, in vehicle computer and text to speech system, etc. Additionally, system 2 may transmit the analysis to the driver's Bluetooth device as an audio message, via e-mail, text, or data to a specific application, etc. Alternatively, the analysis may be transmitted to other parties (e.g., parents of young drivers, insurance companies, etc.). Additionally, vehicle 22 may generate an audible indicating a detected distraction.

Figure 2:
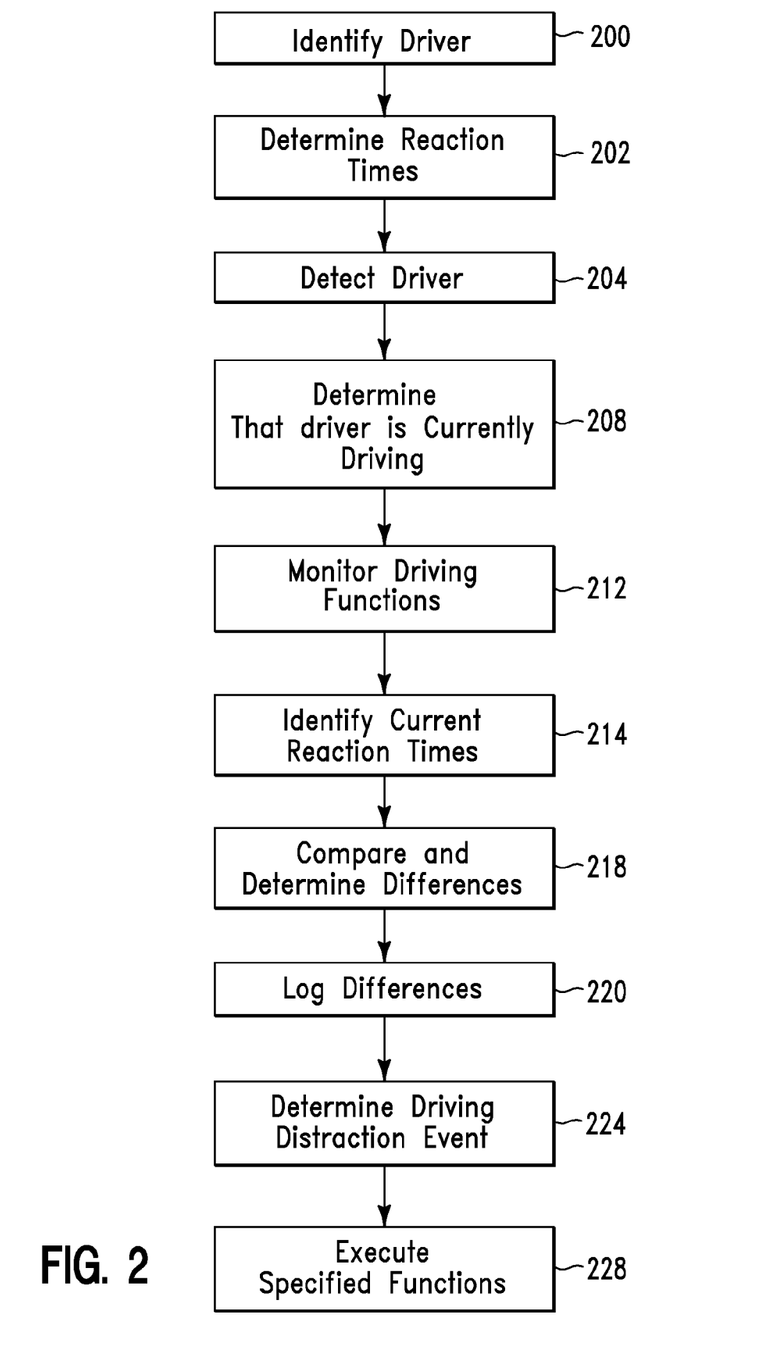
FIG. 2 illustrates an algorithm detailing a process flow enabled by the system of FIG. 1 for providing a means for associating driver reaction times during a driver distraction event, in accordance with embodiments of the present invention.

FIG. 2 illustrates an algorithm detailing a process flow enabled by system 2 of FIG. 1 for providing a means for associating driver reaction times during a driver distraction event, in accordance with embodiments of the present invention. Each of the steps in the algorithm of FIG. 2 may be enabled and executed in any order by a computer processor executing computer code. In step 200, a driver of a vehicle is identified. In step 202, (baseline or non-distracted) reaction times associated with a set of driving functions executed by the driver are determined. The set of driving functions are executed by the driver during a first driving process of the vehicle. In step 204 (after determining the reaction times), the driver is detected in the vehicle. In step 208, it is determined that the driver is currently driving the vehicle. In step 212, currently executed driving functions associated with the set of driving functions are monitored. In step 214, current reaction times associated with the currently executed driving functions are identified. In step 218, the current reaction times are compared to the reaction times and (based on results of the comparing) differences between the current reaction times and the reaction times are determined. Additionally, the differences may be compared to predetermined thresholds to determine if the differences exceed the predetermined thresholds. In step 220, the differences are logged to a driver action log. In step 224, it is determined (based on the driver action log) that the driver is currently executing a first driving distraction event. Determining that the driver is currently executing a first driving distraction event may include the flowing process 1 and process 2:

Process 1
1. Enabling a video retrieval device in the vehicle.
2. Retrieving a video stream of the driver during the currently executed driving functions.
3. Analyzing the video stream.
4. Determining the first driving distraction event based on results of the analyzing.

Process 2
1. Monitoring devices enabled within the vehicle.
2. Analyzing results of the monitoring.
3. Determining the first driving distraction event based on results of the analyzing.

In step 228, specified functions (associated with the currently executed driving functions and/or the first driving distraction event) are executed based on results of steps 218 and/or step 224. Executing the specified functions may include:
1. Notifying an authority of the differences.
2. Alerting the driver of the differences.
3. Disabling/enabling functions associated with said currently executed driving functions (e.g., braking functions, steering functions, etc.). Steps 2 and 3 are associated with monitoring log files within a device (or an application that is installed on the device that transmits event data to a vehicle computer). For example, if a texting process is initiated, the device or application may transmit a wireless signal to the vehicle computer.

4. Modifying attributes of a function (e.g., braking functions, steering functions, etc.) associated with the currently executed driving functions.

5. Disabling functions of a device (e.g., a radio, a cellular telephone, etc.) associated with the first driving distraction event.

6. Modifying functions of a device associated with the first driving distraction event (e.g., adjust a volume on a radio, enabling a hands free speaker on a cellular telephone, etc.).

Figure 3:
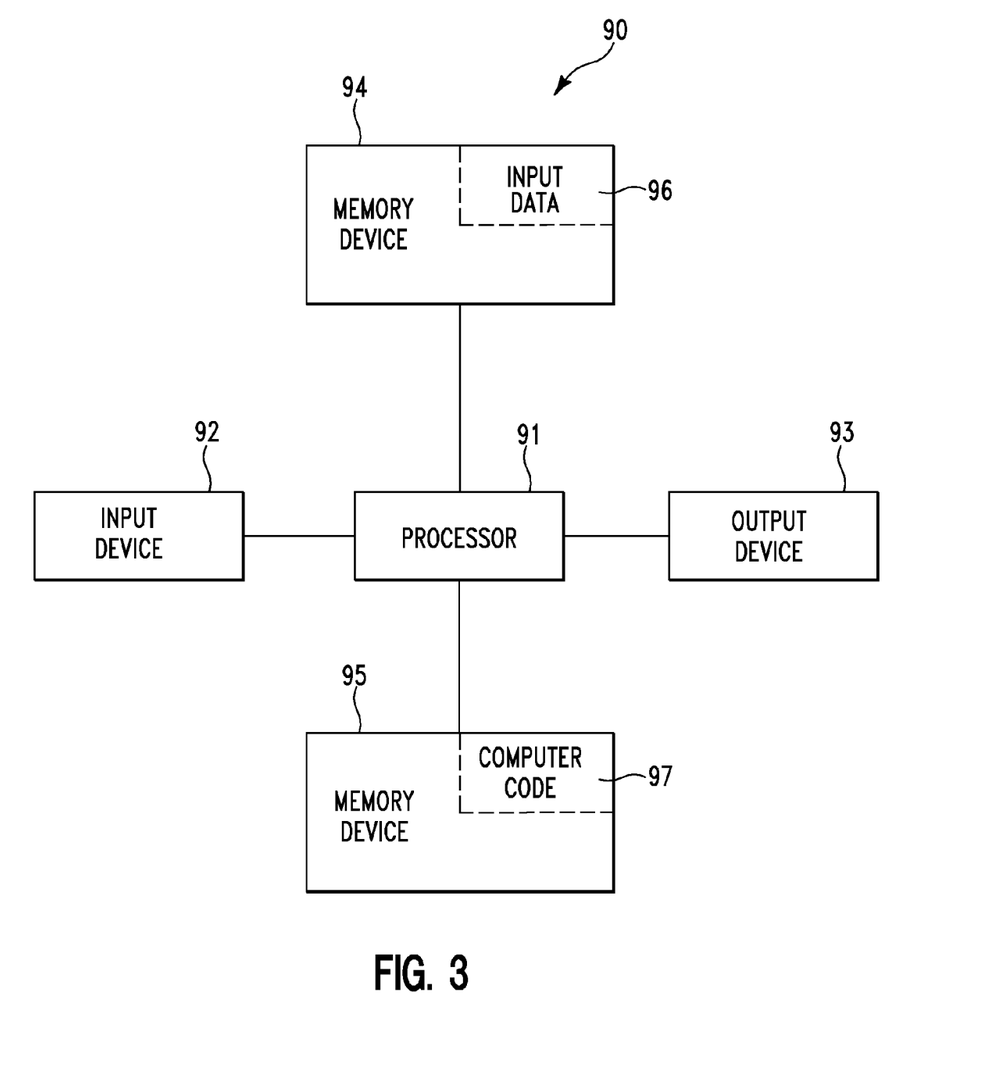
FIG. 3 illustrates a computer apparatus used by the system of FIG. 1 for providing a means for associating driver reaction times during a driver distraction event, in accordance with embodiments of the present invention.

FIG. 3 illustrates a computer system 90 (e.g., computer 14 of FIG. 1) used by system 2 of FIG. 1 for associating driver reaction times during a driver distraction event, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for associating driver reaction times during a driver distraction event. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to associate driver reaction times during a driver distraction event. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for associating driver reaction times during a driver distraction event. In another embodiment, the invention provides a business method that performs the process steps of the invention on a subscription, advertising, and/or fee basis. That is, a service supplier, such as a Solution Integrator, could offer to associate driver reaction times during a driver distraction event. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices. While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
    enabling, by a computer processor of a computing system, a plurality of proximity sensors in a vehicle;
    determining, by said computer processor based on data received from said plurality of proximity sensors, multiple distances between said vehicle and an additional vehicle adjacent to said vehicle;
    detecting, by said computer processor via a mobile device, a traffic signal status with respect to said vehicle;
    determining, by said computer processor based on said multiple distances and said traffic signal status, baseline reaction times associated with a set of driving functions executed by a driver of said vehicle, wherein said set of driving functions are executed by said driver during a first driving process of said vehicle;
    determining, by said computer processor, that said driver is currently driving said vehicle;
    monitoring, by said computer processor, currently executed driving functions associated with said set of driving functions;
    comparing, by said computer processor, current reaction times with said baseline reaction times, wherein said current reaction times are associated with said currently executed driving functions;
    determining, by said computer processor based on results of said comparing, differences between said current reaction times with said baseline reaction times;
    logging, by said computer processor, said differences to a driver action log;
    determining, by said computer processor based on said differences in said driver action log, that said driver is currently performing a first driving distraction event; and
    executing, by said computer processor based on said determining that said driver is currently performing a first driving distraction event, specified functions associated with said currently executed driving functions and said first driving distraction event, wherein said executing said specified functions comprises disabling functions of a device associated with said first driving distraction event.

2. The method of claim 1, wherein said executing said specified functions further comprises:
    alerting said driver of said differences.

3. The method of claim 1, wherein said executing said specified functions further comprises:
    disabling functions associated with said currently executed driving functions.

4. The method of claim 1, wherein said executing said specified functions further comprises:
modifying attributes of a function associated with said currently executed driving functions.

5. The method of claim 1, wherein said executing said specified functions further comprises:
modifying functions of a device associated with said first driving distraction event.

6. The method of claim 1, further comprising:
comparing, by said computer processor, said differences to predetermined thresholds; and
determining, by said computer processor based on results of said comparing said differences to said predetermined thresholds, that said differences exceed said predetermined thresholds, wherein said executing is further based on said differences exceeding said predetermined thresholds.

7. The method of claim 1, wherein said executing said specified functions further comprises:
notifying an authority of said differences.

8. The method of claim 1, wherein said determining that said driver is currently performing a first driving distraction event comprises:
enabling a video retrieval device in said vehicle;
retrieving a video stream of said driver during said currently executed driving functions;
analyzing said video stream; and
determining said first driving distraction event based on results of said analyzing.

9. The method of claim 1, wherein said determining that said driver is currently performing a first driving distraction event comprises:
monitoring devices enabled within said vehicle;
analyzing results of said monitoring; and
determining said first driving distraction event based on results of said analyzing.

10. A computing system comprising a computer processor coupled to a non-transitory memory device, said non-transitory memory device comprising instructions that when executed by the computer processor implements a method comprising:
enabling, by said computer processor, a plurality of proximity sensors in a vehicle;
determining, by said computer processor based on data received from said plurality of proximity sensors, multiple distances between said vehicle and an additional vehicle adjacent to said vehicle;
detecting, by said computer processor via a mobile device, a traffic signal status with respect to said vehicle;
determining, by said computer processor based on said multiple distances and said traffic signal status, baseline reaction times associated with a set of driving functions executed by a driver of said vehicle, wherein said set of driving functions are executed by said driver during a first driving process of said vehicle;
determining, by said computer processor, that said driver is currently driving said vehicle;
monitoring, by said computer processor, currently executed driving functions associated with said set of driving functions;
comparing, by said computer processor, current reaction times with said baseline reaction times, wherein said current reaction times are associated with said currently executed driving functions;
determining, by said computer processor based on results of said comparing, differences between said current reaction times with said baseline reaction times;
logging, by said computer processor, said differences to a driver action log;
determining, by said computer processor based on said differences in said driver action log, that said driver is currently performing a first driving distraction event; and
executing, by said computer processor based on said determining that said driver is currently performing a first driving distraction event, specified functions associated with said currently executed driving functions and said first driving distraction event, wherein said executing said specified functions comprises disabling functions of a device associated with said first driving distraction event.

11. The computing system of claim 10, wherein said executing said specified functions further comprises:
alerting said driver of said differences.

12. The computing system of claim 10, wherein said executing said specified functions further comprises:
disabling functions associated with said currently executed driving functions.

13. The computing system of claim 10, wherein said executing said specified functions further comprises:
modifying attributes of a function associated with said currently executed driving functions.

14. The computing system of claim 10, wherein said executing said specified functions further comprises:
modifying functions of a device associated with said first driving distraction event.

15. The computing system of claim 10, wherein said method further comprises:
comparing, by said computer processor, said differences to predetermined thresholds; and
determining, by said computer processor based on results of said comparing said differences to said predetermined thresholds, that said differences exceed said predetermined thresholds, wherein said executing is further based on said differences exceeding said predetermined thresholds.

16. The computing system of claim 10, wherein said executing said specified functions further comprises:
notifying an authority of said differences.

17. A computer program product for technical solution analysis, the computer program product comprising:
one or more computer-readable, non-transitory storage devices;
program instructions, stored on at least one of the one or more non-transitory storage devices, to enable a plurality of proximity sensors in a vehicle;
program instructions, stored on at least one of the one or more non-transitory storage devices, to determine based on data received from said plurality of proximity sensors, multiple distances between said vehicle and an additional vehicle adjacent to said vehicle;
program instructions, stored on at least one of the one or more non-transitory storage devices, to detect via a mobile device, a traffic signal status with respect to said vehicle;
program instructions, stored on at least one of the one or more non-transitory storage devices, to determine based on said multiple distances and said traffic signal status, baseline reaction times associated with a set of driving functions executed by a driver of said vehicle, wherein said set of driving functions are executed by said driver during a first driving process of said vehicle;

program instructions, stored on at least one of the one or more non-transitory storage devices, to determine that said driver is currently driving said vehicle;

program instructions, stored on at least one of the one or more non-transitory storage devices, to monitor currently executed driving functions associated with said set of driving functions;

program instructions, stored on at least one of the one or more non-transitory storage devices, to compare current reaction times with said baseline reaction times, wherein said current reaction times are associated with said currently executed driving functions;

program instructions, stored on at least one of the one or more non-transitory storage devices, to determine differences between said current reaction times with said baseline reaction times;

program instructions, stored on at least one of the one or more non-transitory storage devices, to log said differences to a driver action log;

program instructions, stored on at least one of the one or more non-transitory storage devices, to determine, based on said differences, that said driver is currently performing a first driving distraction event; and program instructions, stored on at least one of the one or more non-transitory storage devices, to execute specified functions associated with currently performing driving functions and a first driving distraction event, wherein executing said specified functions comprises disabling functions of a device associated with said first driving distraction event.

* * * * *